May 8, 1956 M. O. ORR 2,744,847
FABRIC-BACKED SPONGE GASKET AND METHOD OF MAKING SAME
Filed Sept. 8, 1951
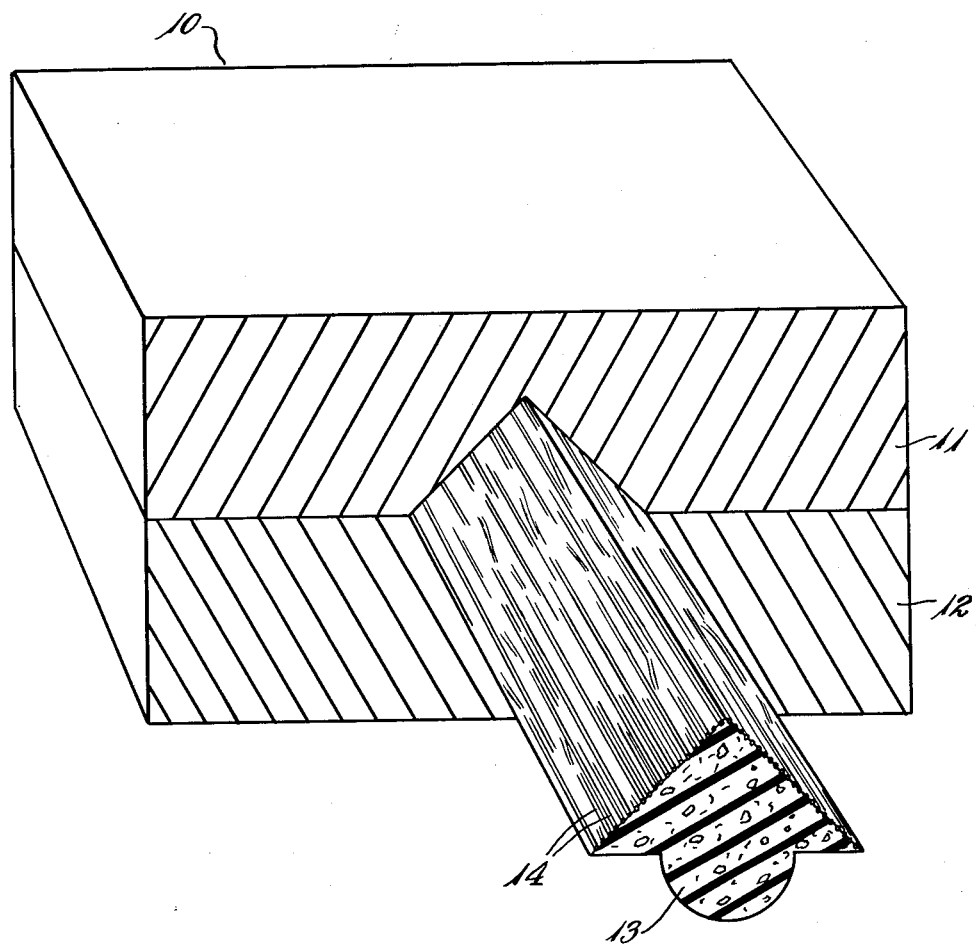
INVENTOR
Marcus O. Orr
By Robert W. Furlong
Atty 2,744,847
FABRIC-BACKED SPONGE GASKET AND METHOD OF MAKING SAME

Marcus O. Orr, Akron, Ohio, assignor to The B. F. Goodrich Company, New York, N. Y., a corporation of New York Application September 8, 1951, Serial No. 245,677

8 Claims. (Cl. 154—93)

This invention relates to a soft and resilient cellular material having a fibrous reinforcement, such as a gasket or sealing strip material, and pertains more specifically to a resilient sponge rubber gasket material such as is used for sealing doors in automobiles, refrigerators and the like, and to methods of making the same.

Heretofore such gasket or sealing members have been formed of sponge rubber or other like materials and then cemented to the automobile door. In some of these gasket strips it has been necessary to mold a reinforcing cord to prevent stretching of the gasket during application and use thereof. All such gaskets, both reinforced and non-reinforced, have been difficult to cement to metallic or other supporting surfaces. After several months use the gaskets sometimes pull away from the metal to which they were formerly secured.

It is an object of this invention to provide a cellular sponge material having a reinforcing layer of unidirectional fibers at one face.

It is also an object of this invention to provide a gasket strip which will adhere strongly to metallic surfaces.

It is an object to provide a light-weight readily compressible rubber gasket which can be readily adhered to metal or other rigid supporting supporting surfaces and which will resist forces tending to stretch the gasket.

It is a further object to provide means for preventing stretching of sponge gasket material.

It is also an object to provide a method of making such a sponge gasket.

It is an object to provide a means of venting the air and the gases generated during the vulcanization of a sponge composition from a mold during expansion of the sponge composition.

Other objects will be apparent from the description which follows.

These objects are attained by molding a non-woven fabric having unidirectional fibers upon one or more surfaces of a sponge material to provide reinforcement for the sponge and to provide a surface having many extending fibers which will enhance the adhering qualities of the material when cemented to a metal or other supporting surface.

In the accompanying drawing is a perspective view, partly broken away and in section, of a mold and a gasket formed therein.

In making the gasket strip of this invention, a suitable vulcanizable rubber composition containing a blowing agent is first prepared by conventional methods. Such a composition is as follows:

| Ingredient: | Parts by weight |
|---|---|
| GR–S | 100 |
| Whiting | 80 |
| Carbon black | 20 |
| Sodium bicarbonate | 15 |
| Sulfur | 3 |
| Zinc oxide | 5 |
| Tetramethyl thiuram monosulfide | 1 |
| Stearic acid | 10 |
| Heavy process oil | 80 |

The cavity of mold 10 which is formed by mold halves 11 and 12 is then partially filled with a strip of the foregoing composition, leaving sufficient space for expansion of the composition into cellular or sponge form. A satisfactory gasket strip is produced by permitting the composition to expand to 300–600% of its original volume. Over the top of the composition is disposed a layer of unwoven fabric consisting of a thin layer or web of generally parallel cotton fibers, such as sliver, the fibers running longitudinally of the strip. The composition is then heated in the mold at 325° F. for fifteen minutes to expand the rubber composition and vulcanize it, forming a sponge rubber strip 13. During the expansion step the fibers 14 become adhered to and/or partially embedded in the surface of the rubber composition, and the air displaced from the mold is vented evenly and smoothly through the interstices between the fibers.

The resultant sponge rubber strip, as shown in the drawing contains a thin layer of unidirectional unwoven untwisted individual cotton fibers 14 secured to the attaching faces of the strip providing an excellent surface for adhesion by means of rubber cement or the like.

By means of this invention there is eliminated the necessity for using a powder such as soapstone, talc, mica or the like on the surface of the sponge composition to prevent sticking to the mold, since the unwoven fabric or sliver performs this function. Absence of such powder from the surface of the vulcanized strip facilitates adhesion of the strip to a supporting member such as a metal door frame; in fact, the presence of loose ends of fibers greatly assists in obtaining adhesion, better results being obtained in adhering the strip of this invention with cement than are obtained in using a strip having a bare rubber surface. In addition, the fibrous layer provides longitudinal reinforcement of the sponge strip, preventing it from being stretched during its application to a supporting member. Stretching is undesirable, of course, in that the cross section of the strip is thereby reduced resulting in a faulty seal.

Although the invention has been described with reference to a specific vulcanized rubber gasket or sealing strip composition as an embodiment, it will be apparent that any resilient cellular composition may be employed including those made from natural or synthetic rubber or from heat-softening resilient rubber-like materials such as plasticized vinyl resins, e. g., plasticized polyvinyl chloride or the like. If desired, a rubber composition which contains sufficient sulfur to be vulcanized to a hard condition may be employed, and a wide variety of either hard or resilient heat-softening binders may be used, including phenolaldehyde resins, urea-formaldehyde resins, polystyrene, etc. Similarly, the layer of unwoven fibrous material may comprise any of the textile fibers, both naturally occurring fibers such as cotton, wool, silk, etc., as well as synthetic fibers such as rayon, nylon, etc. The layer of fibrous material is preferably relatively thin, being of the order of one to ten fiber diameters in thickness. The fibers in such a layer are generally parallel, although there is some crossing or tangling in order to keep the sheet from falling apart during handling. It may be prepared, for example, by spreading and drawing ordinary cotton sliver until the desired degree of attenuation is reached.

Obvious variations and modifications are within the scope of this invention as defined in the appended claims.

I claim:

1. A sealing gasket comprising an elastomeric sponge body portion having a face adapted for securement to a supporting member, and a thin fibrous web of unwoven fabric consisting essentially of unidirectional unwoven untwisted individual fibers bonded to said face of said body portion, said web of unwoven fabric being essentially inextensible in the direction in which the unidirectional fibers thereof extend.

2. A compressible sealing strip comprising an elongated elastomeric sponge body portion having a face adapted for securement to a supporting member, and a thin fibrous web of unwoven fabric consisting essentially of unidirectional unwoven untwisted individual fibers bonded to said face of said body portion, said web of unwoven fabric being essentially inextensible in the direction in which the unidirectional fibers thereof extend, the unidirectional fibers of said web of unwoven fabric lying generally parallel to the longitudinal axis of said sealing strip.

3. A sealing strip comprising an elongated vulcanized sponge rubber body portion having a face adapted for securement to a supporting member, and a thin fibrous web of unwoven fabric consisting essentially of unidirectional unwoven untwisted individual fibers bonded to said face of said body portion, said web of unwoven fabric being essentially inextensible in the direction in which the unidirectional fibers thereof extend, the unidirectional fibers of said web of unwoven fabric lying generally parallel to the longitudinal axis of said sealing strip.

4. A sealing strip comprising an elongated vulcanized sponge rubber body portion having a face adapted for adhesion to a supporting member, and a thin fibrous web of unwoven fabric consisting essentially of unidirectional unwoven untwisted individual fibers secured to and partially embedded in said face of said body portion, said web of unwoven fabric being essentially inextensible in the direction in which the unidirectional fibers thereof extend, the unidirectional fibers of said web of unwoven fabric lying generally parallel to the longitudinal axis of said sealing strip.

5. A sealing strip comprising an elongated vulcanized sponge rubber body portion having a face adapted for securement to a supporting member, and a thin fibrous web of unwoven fabric consisting essentially of unidirectional unwoven untwisted individual cotton fibers bonded to said face of said body portion, said web of unwoven fabric being essentially inextensible in the direction in which the unidirectional fibers thereof extend, the unidirectional fibers of said web of unwoven fabric lying generally parallel to the longitudinal axis of said sealing strip.

6. The method for making a sealing strip which comprises providing an elongated body of heat-softening composition containing a blowing agent, disposing a fibrous web of unwoven fabric consisting essentially of unidirectional unwoven untwisted individual fibers, the said web of unwoven fabric being essentially inextensible in the direction in which the unidirectional fibers thereof extend, adjacent a face of said elongated body of heat-softening composition with the unidirectional fibers of said web of unwoven fabric lying generally parallel to the longitudinal axis of said elongated body of heat-softening composition, and heating said body of heat-softening composition and web of unwoven fabric within a confining mold to expand said heat-softening composition into cellular form and press it against said fibers of said web of unwoven fabric to bond said fibers to said face of the expanded body of the sealing strip.

7. The method for making a sealing strip which comprises providing an elongated body of vulcanizable rubber composition containing a blowing agent, disposing a fibrous web of unwoven fabric consisting essentially of unidirectional unwoven untwisted individual fibers, the said web of unwoven fabric being essentially inextensible in the direction in which the unidirectional fibers thereof extend, adjacent a face of said elongated body of vulcanizable rubber composition with the unidirectional fibers of said web of unwoven fabric lying generally parallel to the longitudinal axis of said elongated body of vulcanizable rubber composition, and heating said body of vulcanizable rubber composition and web of unwoven fabric within a rigid confining surface to expand and vulcanize said vulcanizable rubber composition of said body and to press said web of unwoven fabric into bonded engagement with said face of the expanded body of the sealing strip.

8. The method for making a sponge rubber sealing strip which comprises providing an elongated body of vulcanizable rubber composition containing a blowing agent, disposing a fibrous web of unwoven fabric consisting essentially of unidirectional unwoven untwisted individual cotton fibers, the said web of unwoven fabric being essentially inextensible in the direction in which the unidirectional fibers thereof extend, adjacent a face of said elongated body of vulcanizable rubber composition with the unidirectional fibers of said web of unwoven fabric lying generally parallel to the longitudinal axis of said elongated body of vulcanizable rubber composition, and heating said body of vulcanizable rubber composition and web of unwoven fabric within a rigid confining surface to expand and vulcanize said vulcanizable rubber composition and to bond said web of unwoven fabric to said face of the expanded body of the sealing strip.

References Cited in the file of this patent

UNITED STATES PATENTS

| Number | Name | Date |
|---|---|---|
| 637,636 | Meyer | Nov. 21, 1899 |
| 1,499,166 | Frazier | June 24, 1924 |
| 1,512,096 | Hopkinson | Oct. 21, 1924 |
| 1,645,604 | Lower | Oct. 18, 1927 |
| 1,880,700 | Beynon | Oct. 4, 1932 |
| 2,021,868 | Patterson | Nov. 19, 1935 |
| 2,055,821 | Hansen et al. | Sept. 29, 1936 |
| 2,079,731 | Clark | May 11, 1937 |
| 2,121,827 | Roberts | June 28, 1938 |
| 2,152,719 | Williams | Apr. 4, 1939 |
| 2,163,289 | Pennel et al. | June 20, 1939 |
| 2,297,018 | Overstreet | Sept. 29, 1942 |
| 2,389,210 | Pitman | Nov. 20, 1945 |
| 2,561,798 | Jensen | July 24, 1951 |
| 2,631,957 | Francis | Mar. 17, 1953 |